April 28, 1931.　　　D. F. DOMIZI　　　1,802,461
MOTOR VEHICLE AXLE CONSTRUCTION
Filed Dec. 5, 1927
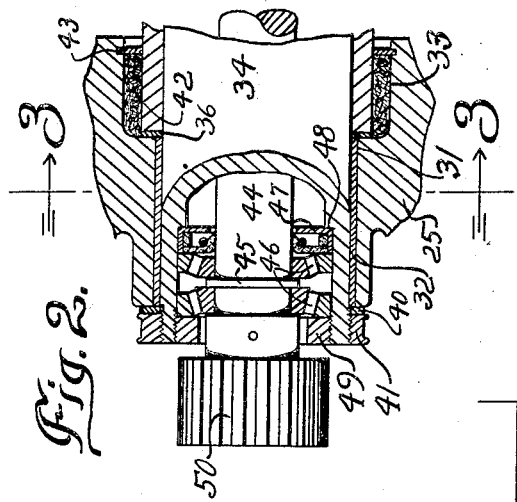
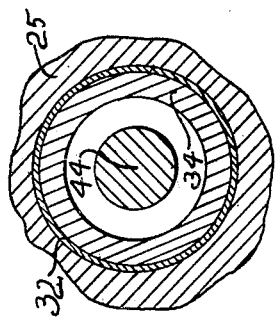
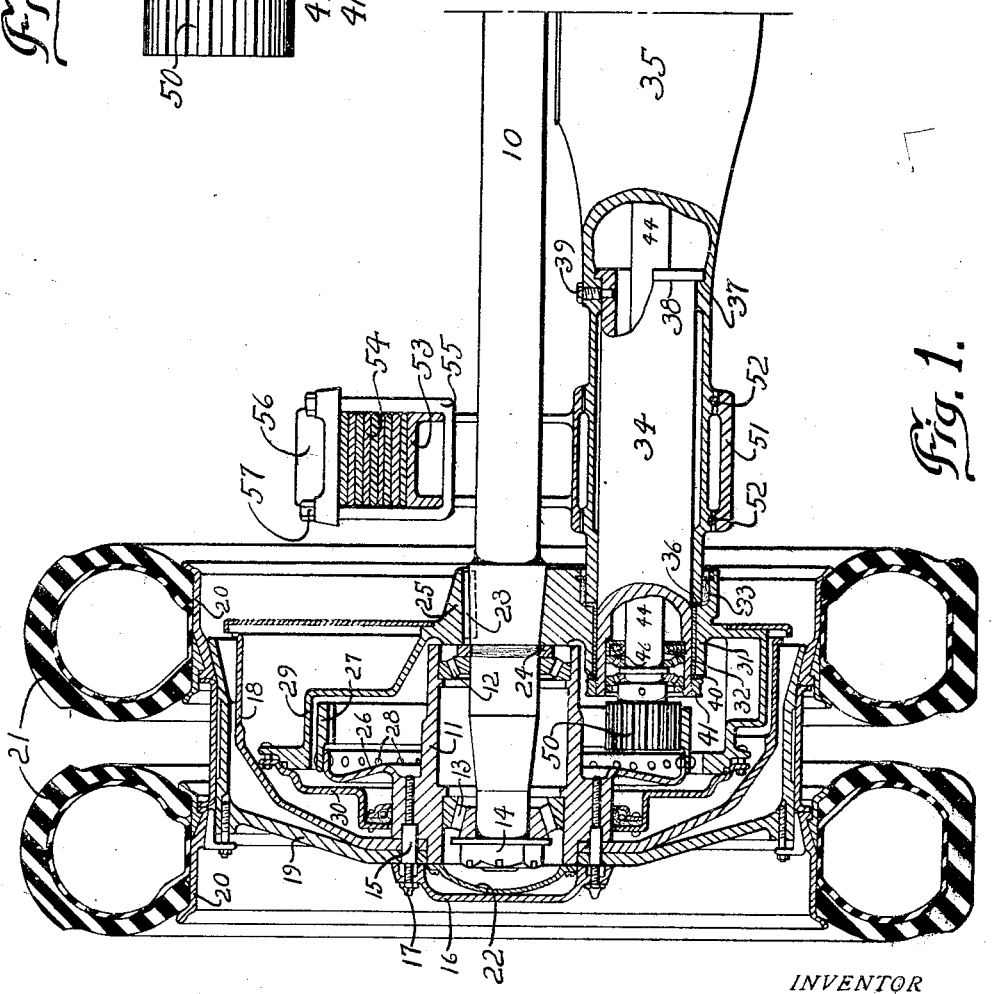
INVENTOR
DAVID F. DOMIZI.
BY
*Irving Harness*
ATTORNEY Patented Apr. 28, 1931

1,802,461

UNITED STATES PATENT OFFICE

DAVID F. DOMIZI, OF LIMA, OHIO, ASSIGNOR TO RELAY MOTOR PRODUCTS CORPORATION, A CORPORATION OF DELAWARE

MOTOR-VEHICLE AXLE CONSTRUCTION

Application filed December 5, 1927. Serial No. 237,697.

This invention relates to axle construction and particularly to such constructions as are conventionally employed at the rear end of motor vehicles, the principal object being to provide a new and novel construction therefor which will permit ease in the manufacture, the assembly and disassembly thereof.

Another object is to provide a rear axle housing with a removable sleeve therein providing an extension of the same.

Another object is to provide an axle housing with a sleeve removably received in the end thereof, the sleeve serving to transmit the load carried by the housing to the wheels.

A further object is to provide an axle construction including a supporting member provided with an opening, an axle housing provided with a removable sleeve member positioned with the sleeve rotatably received in the opening in the supporting member, means being provided for locking the sleeve axially with respect to the housing and locking the supporting member axially of the sleeve.

The above being among the objects of the present invention the same consists in certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views:

Fig. 1, is a vertical sectional view taken centrally through a rear axle for a motor vehicle.

Fig. 2, is an enlarged view of the connection between the housing and the supporting member of the construction shown in Fig. 1.

Fig. 3, is a sectional view taken on the line 3—3 of Fig. 2.

In the accompanying drawing I show the present invention in connection with a vehicle rear axle of the tread mill type, the action of which is described in my application for Letters Patent of the United States for motor vehicle construction, filed January 7, 1927, Serial No. 159,597, now Patent No. 1,677,917, granted July 24, 1928, and in which the load carrying housing is rotatable relative to the wheel axle whereby when an obstruction or other resistance is met by the wheel the axle housing with the load carried thereby is caused to move forwardly and up with respect to the wheel axle whereby an increased leverage is caused to act on the wheels in the same manner as in a tread mill, to aid the wheels in overcoming the obstruction or resistance.

In the drawing I show a wheel axle 10 to the outer end of which is secured a hub 11 by means of the bearings 12 and 13 and nut 14. Secured to the hub 11 by means of the pins 15, cap 16 and nuts 17 is a brake drum 18 and wheel 19 carrying the rims 20 to which are secured the tires 21. A cap 22 is positioned over the open end of the hub 11 beneath the cap 16 in order to protect the bearings 12 and 13 against the entrance of dirt and dust when the cap 16 is removed for the purpose of removing the wheel 19 or brake drum 18. Secured to the axle 10 by means of a taper fit, key 23 and nut 24 is a supporting member 25 for the brake bands and other braking mechanism (not shown), and for another purpose to be described later.

The hub 11 is provided with an extending flange portion 26 to which is secured an internal ring gear 27 by means of rivets 28 or other suitable means. The supporting member 25 is provided with an outwardly extending flange portion 29 which co-operates with a casing member 30 to provide an oil tight enclosure for the ring gear 27. The supporting member 25 below the axle 10 is provided with an opening 31 which is lined with a bushing 32. The opening 31 at the inner end thereof is enlarged as at 33.

Rotatably received in the bushing 32 is a sleeve member 34 which in turn is removably received within the axle housing 35, the sleeve 34 projecting beyond the outer end of the housing 35 at the point where it is received in the bushing 32. The outer end of the housing 35 extends into the enlarged portion 33 of the opening 31 and a thrust bearing 36 is provided between its end and the shoulder formed at the point of juncture of the openings 31 and 33. The axle housing 35 is provided with a radially extending interior abutment 37 against which the outwardly extending flange 38 on the inner end of the sleeve 34 abuts.

A screw pin 39 extends through the housing 35 and into the sleeve 34 to prevent rotation thereof. The outer end of the sleeve 34 is provided with a washer 40 and a nut 41 which co-act with the outer face of the supporting member 25 and act to draw the sleeve 34 and housing 35 outwardly so as to confine the member 25 between the washer 40 and the outer end of the housing 35, thereby locating the housing 35 axially of the opening 31 and the sleeve 34 axially in respect to the supporting member 25. Felt or other fibrous material 42 is positioned around the end of the housing 35 within the opening 33 and retained therein by means of a split ring 43 and serves to prevent the entrance of dust or dirt to the bearing surfaces of the sleeve 34. Within the sleeve 34 and housing 35 is a driving axle 44 provided adjacent its outer end with a circumferential flange 45. Bearings 46 are provided between the axle 44 and sleeve 34 on either side of the flange 45, the inner bearings co-acting with a dust guard 47 and shoulder 48 formed on the inner surface of the sleeve 34. And the outer bearing 46 being held against axial movement in the sleeve 34 by the nut 49, in order to prevent axial movement of the axle 44 in respect to the sleeve 34. A pinion gear 50 is secured to the outer end of the axle 44 in meshing relationship with respect to the internal gear 27 so that rotation of the axle 44 acting through the pinion 50 and internal gear 27 will cause rotation of the wheel 19. A spring perch 51 is non-rotatably secured to the housing 35 by a splined connection and bolts 52 and extends upwardly therefrom in normally spaced relationship with respect to the wheel axle 19 and is formed to provide a spring seat 53 above the wheel axle 10 for the load carrying springs 54 which are secured thereto by means of the U-shaped bolt 55, cap 56 and nuts 57.

Formal changes may be made in the specific embodiment of the invention described without departing from the spirit or substance of the broad invention the scope of which is commensurate with the appended claims.

What I claim is:

1. In combination, a swingable supporting member having a wheel rotatably mounted thereon and provided with an opening eccentric to said wheel, an axle housing provided with an internal abutment, a sleeve received in said housing provided with a flange contacting against said abutment, said sleeve projecting out past the end of said housing and being rotatably received in said opening, and an adjustable member on said sleeve co-acting with the outer face of said supporting member for drawing the outer end of said housing into contact with the inner face of said supporting member.

2. In combination a wheel, a spindle for said wheel, a supporting member mounted on said spindle and swingable about the axis thereof, said supporting member being provided with an opening therein eccentric to said spindle, an axle housing in parallel relationship with respect to said spindle, a sleeve secured within said housing and projecting therefrom, said sleeve being rotatably received in said opening, an axle shaft rotatably mounted within said sleeve, and gears connecting said axle shaft and wheel for driving engagement.

3. In combination a wheel, a spindle for said wheel, a supporting member mounted on said spindle and swingable about the axis thereof, said supporting member being provided with an opening therein eccentric to said spindle, an axle housing in parallel relationship with respect to said spindle, a sleeve secured within said housing and projecting therefrom, said sleeve projecting through said opening, a nut on the outer end of said sleeve co-acting with the outer face of said supporting member to draw the outer end of said housing into a predetermined relationship with respect to the inner face of said housing, an axle shaft rotatably mounted within said sleeve, and gears connecting said axle shaft and said wheel for driving engagement.

4. In combination a wheel, a spindle for said wheel, a supporting member mounted on said spindle and swingable about the axis thereof, said supporting member being provided with an opening therein eccentric to said spindle, said opening being enlarged at its inner end forming a shoulder at the point of enlargement, an axle housing lying in parallel and eccentric relationship with respect to said spindle having an end thereof rotatably received in the enlarged portion of said opening, a sleeve non-rotatably secured in said axle housing projecting therefrom and rotatably received in the smaller portion of said opening, means cooperating with said sleeve for maintaining the axial position of said housing relative to said supporting member, an axle shaft rotatably mounted in said sleeve and projecting outwardly therefrom, and gears connecting said shaft and wheel for transmitting driving effort therebetween.

5. In combination a wheel, a spindle for said wheel, a supporting member mounted on said spindle and swingable about the axis thereof, said supporting member being provided with an opening therein eccentric to said spindle, said opening being enlarged at its inner end forming a shoulder at the point of enlargement, an axle housing lying in parallel and eccentric relationship with respect to said spindle having an end thereof rotatably received in the enlarged portion of said opening and in freely spaced relation with respect to the side walls thereof, yieldable means retained between said side walls and said housing sealing the space therebetween against the entrance of foreign matter, a sleeve non-rotatably secured in said axle housing projecting therefrom and rotatably received in the smaller portion of said opening, means coperating with said sleeve for maintaining the axial position of said housing relative to said supporting member, an axle shaft rotatably mounted in said sleeve and projecting outwardly therefrom, and gears connecting said shaft and wheel for transmitting driving effort therebetween.

DAVID F. DOMIZI.